United States Patent
Lovlekar et al.

(10) Patent No.: US 12,041,605 B2
(45) Date of Patent: Jul. 16, 2024

(54) RRC PROCESSING DELAYS ASSOCIATED WITH MULTI-SIM UES

(71) Applicant: APPLE INC., Cupertino, CA (US)

(72) Inventors: Srirang A. Lovlekar, Cupertino, CA (US); Ahmed Mohamed Ibrahim Hassan, Bavaria-Bayern (DE); Amr Mostafa, Bavaria-Bayern (DE); Birgit Breining, Bavaria-Bayern (DE); Fangli Xu, Beijing (CN); Haijing Hu, Cupertino, CA (US); Naveen Kumar R Palle Venkata, San Diego, CA (US); Sethuraman Gurumoorthy, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 437 days.

(21) Appl. No.: 17/593,524

(22) PCT Filed: Jan. 14, 2021

(86) PCT No.: PCT/CN2021/071919
§ 371 (c)(1),
(2) Date: Sep. 20, 2021

(87) PCT Pub. No.: WO2022/151264
PCT Pub. Date: Jul. 21, 2022

(65) Prior Publication Data
US 2023/0180218 A1 Jun. 8, 2023

(51) Int. Cl.
*H04W 76/10* (2018.01)
*H04W 8/22* (2009.01)
(Continued)

(52) U.S. Cl.
CPC ......... *H04W 72/1268* (2013.01); *H04W 8/22* (2013.01); *H04W 76/19* (2018.02); *H04W 88/06* (2013.01)

(58) Field of Classification Search
None
See application file for complete search history.

(56) References Cited

U.S. PATENT DOCUMENTS

| 10,623,946 | B1 * | 4/2020 | Kumar | H04W 76/16 |
| 2014/0023016 | A1 * | 1/2014 | Mildh | H04W 36/0069 370/329 |

(Continued)

FOREIGN PATENT DOCUMENTS

| CN | 111557102 A | 8/2020 |
| WO | WO-2020166952 A1 * | 8/2020 |

OTHER PUBLICATIONS

Apple Inc., "Methods for Multi-SIM Network Switching", R2-2009506, 3GPP TSG-RAN WG2 Meeting #112e, Electronic, Agenda Item [8.3.3] [Multi SIM][UE Notification on network switching], Nov. 2-13, 2020, 8 pages.

(Continued)

*Primary Examiner* — Ajit Patel
(74) *Attorney, Agent, or Firm* — Dorsey & Whitney LLP

(57) ABSTRACT

Determining RRC processing delays for multi-subscriber identify module (MSIM) user equipments (UEs) may include decoding a capabilities message from a UE that indicates the UE is an MSIM UE that includes at least a first SIM and a second SIM. A communication for the first SIM of the UE may be encoded. The communication may be configured to cause the UE to perform a radio resource control (RRC) procedure. A transmission request received from the UE may be decoded. The transmission request may be associated with the RRC procedure. In response to receiving the transmission request, an uplink (UL) gram may be scheduled for the first SIM of the UE.

19 Claims, 11 Drawing Sheets

(51) Int. Cl.
    *H04W 72/1268* (2023.01)
    *H04W 76/19* (2018.01)
    *H04W 88/06* (2009.01)

(56) References Cited

U.S. PATENT DOCUMENTS

| | | | |
|---|---|---|---|
| 2017/0367125 A1* | 12/2017 | Krishnamoorthy | ... H04W 68/02 |
| 2018/0070327 A1 | 3/2018 | Qureshi et al. | |
| 2018/0077728 A1 | 3/2018 | Shi et al. | |
| 2018/0227904 A1* | 8/2018 | Raghunathan | ........ H04W 72/51 |
| 2019/0053130 A1* | 2/2019 | Guo | ..................... H04L 1/0026 |

OTHER PUBLICATIONS

Nokia, Nokia Shanghai Bell, Oppo, Fraunhofer HHI, "KI#3 New solution: Coordinated leaving Using MUSIM Assistance Information", S2-2003767, SA WG2 Meeting #139E, online, Agenda Item 8.10, Jun. 1-12, 2020, 3 pages.

PCT/CN2021/071919, International Search Report and Written Opinion, Oct. 12, 2021, 9 pages.

\* cited by examiner

RRC PROCESSING DELAYS ASSOCIATED WITH MULTI-SIM UES

TECHNICAL FIELD

This application relates generally to wireless communication systems, including determining radio resource control (RAC) processing delays associated with multi-SIM UEs.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Current LTE and NR specifications specify radio resource control (RRC) processing delay requirements as shown by the following examples: 1. LTE (Rel-16 Section 36.331) procedures include: a. An RRC connection reconfiguration (Seed addition release) with an RRC connection reconfiguration message from an E-UTRAN to a UE and an RRC connection reconfiguration complete message from the UE to the E-UTRAN, which has a total expected time of 20 ms; b. An RRC connection reconfiguration (SCG establishment release, SCG cell addition/release) with an RRC connection reconfiguration message from an E-UTRAN to a UE and an RRC connection reconfiguration complete message from the UE to the E-UTRAN, which has a total expected time of 20 ms; and c. A UE capability transfer with a UE capability enquiry message from an E-UTRAN to a UE aid a UE capability information message front the UE to the E-UTRAN, which has a total expected time of 10 ms unless the UE has to report at least one of: i. MR-DC band combinations; ii. NR band combinations; or iii. EUTRA feature sets (in which case the expected time is extended to 80 ms); and 2. NR (Rel-16 Section 38.331) procedures include: a. An RRC reconfiguration (Scell addition/release) with an RRC reconfiguration message from an E-UTRAN to a UE and an RRC reconfiguration complete message from the UE to the E-UTRAN, which has a total expected time of 10 ms, b. A UE capability transfer with a UE capability enquiry message from an E-UTRAN to a UE and a UE capability information message from the UE to the E-UTRAN, which has a total expected time of 80 ms; and c. An RRC resume (Scell addition) with an RRC resume message from an E-UTRAN to a UE and an RRC resume complete message from the UE to the E-UTRAN, which has a total expected time of 16 ms.

Notably, the processing times, as in the examples above, are per RRC procedure and each RRC task/module can only run one RRC procedure at a time. Multiple universal subscriber identity module (MUSIM) UEs (e.g., a mobile phone) can have multiple RRC's and each RRC can be in a connected mode or idle/inactive mode. However, current LTE and NR RRC specifications do not specify how RRC processing delay requirements are impacted when multiple RRC's are running on a MUSIM UE (also referred to herein as MSIM UEs) where each RRC is attributed to a single SIM instance. For instance, it has not been clear whether the MUSIM UE should consider: 1. An RRC processing delay that is higher than the recommended values (i.e., the values recommended base on single SIM UEs) as specified in the current specification release; 2. An increase in the processing delay commensurate with the time needed to multi-task multiple RRC's running across multiple SIM instances; and/or 3. How much to increase the processing delay for MUSIM UEs' modes of operation.

Figure 1:
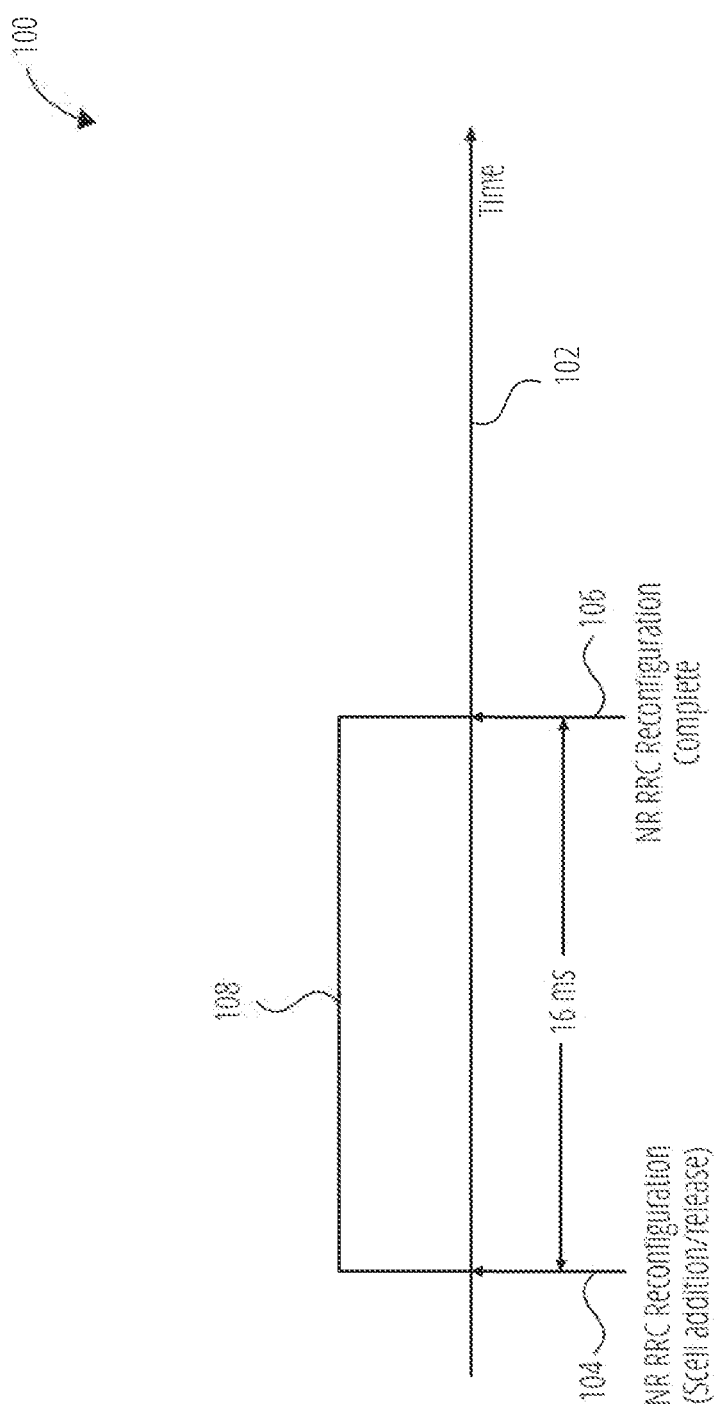
FIG. 1 illustrates an example timing diagram of a single-SIM user equipment.

FIG. 1 illustrates a timing diagram 100 corresponding to a single subscriber identity module (SSIM) UE. As shown, the timing diagram 100 includes a timeline 102 and a block of time 108 associated with the time it takes (16 milliseconds (ms)) to perform an RRC reconfiguration procedure from the beginning of an RRC reconfiguration (as represented by arrow 104) to the RRC reconfiguration being complete (as represented by arrow 106) with respect to the SSIM UE. Accordingly, an SSIM UE has to execute an RRC reconfiguration procedure within 16 ms according to current specifications. Processing the RRC reconfiguration is not interrupted by any high priority activity and completes the processing in the recommended time of 16 ms.

Figure 2:
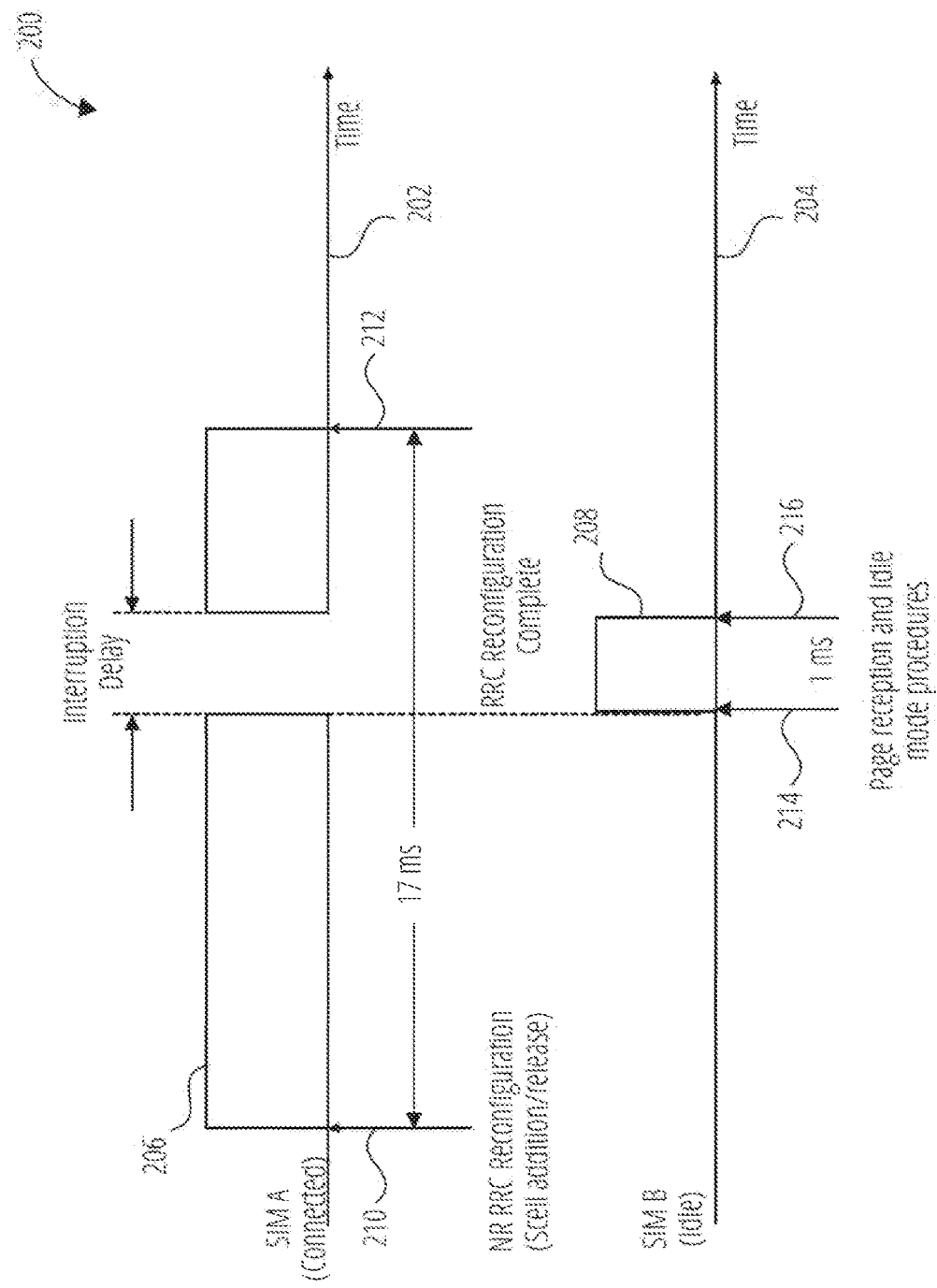
FIG. 2 illustrates an example timing diagram of a multi-SIM user equipment.

FIG. 2 illustrates a timing diagram 100 corresponding to a multiple universal subscriber identity module (MUSIM) UE. As shown, the timing diagram 200 includes timeline 202 associated within an RRC reconfiguration procedure of SIM A, a timeline 204 associated with page reception/idle mode procedures of SIM B, a block of time 206 associated with the time it takes (17 ms) to perform an RRC reconfiguration procedure from the beginning of an RRC reconfiguration (as represented by arrow 210) to the RRC reconfiguration being complete (as represented by arrow 212) when a block of time 208 associated with page reception/idle mode procedures associated with SIM B (as represented by arrow 214 and arrow 216) that occur during, and interrupt, the RRC reconfiguration of SIM A. Notably, such procedures while discussed with respect to specific SIMs throughout may be ultimately performed by a baseband processor of the MSIM UE. Accordingly, the MUSIM UE may not be able to execute the RRC reconfiguration procedure within the 16 ms timeframe outlined in current specifications. In other words, processing the RRC reconfiguration is interrupted by a high priority activity associated with a second SIM and completes processing outside the expected time of 16 ms (i.e., 17 ms in this example).

At a more general level with respect to FIG. 2, SIM A (i.e., a first SIM of a MUSIM UE) is in connected mode and an RRC Reconfiguration message associated with SIM A is received by the baseband processor, which starts processing the message. While the baseband processor is processing the RRC reconfiguration, SIM B (i.e., a second SIM of the MUSIM UE), which is in idle mode, gets a page (i.e., the baseband processor ultimately receives/decodes the page). In response to the page, the baseband processor may perform page decoding and idle mode measurements as a paging occasion may be treated as a higher priority than the connection of SIM A, in some embodiments. In such embodiments, these actions associated with SIM B may interrupt the reconfiguration processing activity associated with SIM A. Page decoding, processing and idle mode measurements (e.g., serving cell measurements, intra cell measurements, inter cell measurements, inter RAT measurements, and so forth) associated with SIM B and performed by the baseband processor may take 1 ms, for example. Note that 1 ms for such actions is only an example and such actions may take any amount of time that is more or less than 1 ms. Once the activity associated with SIM B is completed, the RRC reconfiguration procedure associated with SIM A may resume and the completion deadline (of 16 ms) gets extended as a result of the interruption caused by actions associated with SIM B (e.g., extended to 17 ms in the example of a 1 ms interruption).

In the example of FIG. 2, an interruption (e.g., due to potential cell re-selection or responding to paging in the ease of a dual sim dual active (DSDA) UE) triggered in association with SIM B (after idle mode measurements) occurs, which is not considered in current specifications. Regardless, such interruption causes an increased interruption lime associated with the procedures of SIM A when the baseband processor triggers cell re-selection and/or sends a paging response correspond to SIM B, despite current specifications. In other words, in such cases, the procedure associated with SIM A may take longer than the recommended 16 ms for processing an RRC reconfiguration when an interruption occurs because of SIM B (e.g., receipt/processing of paging from a network (NW)).

In another example of an interruption of SIM A RRC reconfiguration processing corresponding to SIM B, SIM B (i.e., the baseband processor in association with SIM B) may get paged for system information block (SIB) modification if SIM B's NW starts a commercial mobile alert system (CMAS) broadcast or an earthquake and tsunami warning system (ETWS) broadcast. In such embodiments, CMAS/ETWS reception corresponding to SIM B might be given higher priority than the RRC reconfiguration corresponding to SIM A on the same MUSIM UE. Once again, such embodiments may also result in increased interruption time to RRC reconfiguration processing associated with SIM A when CMAS/ETWS broadcasts are received that correspond to SIM B.

In contrast, when the ongoing RRC procedure associated with a connected mode SIM A is prioritized over idle mode processing associated with SIM B (e.g., paging processing, cell re-selection, and so forth), cell re-selection or response to paging associated with SIM B may be delayed by as much as the processing time used to complete processing of the received RRC message corresponding to SIM A. Such prioritization can impact both key performance indicators (KPI)/performance and user experience associated with SIM B.

A first solution to the problems described above may include the UE indicating when the RRC procedure associated with SIM A is complete, as further described below. Notably, an NW has to have a predictable UE processing time for numerous reasons, including to assist the NW in scheduling UL grants (i.e., scheduling a UL grant for a UE) for the response message from a UE. For instance, in the ease of the NR RRC reconfiguration procedure, a NW can schedule a UL grant for the UE 16 ms after the NW has successfully transmitted the RRC reconfiguration message to the UE in the downlink (DL). More specifically, the NW can schedule the UL grant to the UE for signaling radio bearer 1 (SRB1) transmission in 16 ms in order for the UE to transmit an RRC reconfiguration complete message. Note, however, that an interruption caused by a second SIM of a MUSIM UE may create an issue with the timing between the NW transmitting an RRC reconfiguration message and scheduling a UL grant for the UE to respond.

In response to such variable increases in the RRC response message from an MUSIM UE (as described above), the first solution may include: 1. The NW being informed that the UE is in MUSIM mode (or is a MUSIM device); and 2. For MUSIM UEs, the NW not providing the UL grant for the RRC response message transmission according to the processing time specified in Release 16 (Rel-16) version of 3GPP TS 38.331. Instead, the NW may schedule the UL grant to the UE upon receiving a transmission request (e.g., scheduling request (SR) or random access channel (RACH)) from the UE. In other words, when the first SIM (i.e., the baseband processor in association with the first SIM) of a MUSIM UE completes the RRC reconfiguration procedure and is ready to transmit the RRC reconfiguration complete message, then the baseband processor may transmit an SR (or a RACH if there hasn't been a grant for SR transmission) associated with the first SIM to request a UL grant to transmit the RRC reconfiguration complete message.

A second solution to the problems described above includes increasing the RRC processing delay specified in Rel-16 of specification. In particular, instead of using a constant "x" factor for all RRC procedures, a prioritized scheme can be implemented wherein an expected processing delay remains the same for procedures that are handled at higher priority in association with the connected mode SIM (i.e., first SIM that is connected to an NW) while all other procedures (i.e., procedures performed that correspond to the previously idle second SIM that are a higher priority than the current RRC reconfiguration corresponding to the first SIM) include an increase of "x" amount of processing time. For instance, an Initial Security Activation or RRC re-establishment corresponding to the first SIM might be handled at a higher priority than any potential interrupting procedure handled that correspond to the second SIM. In some embodiments, all other potential interrupting procedures handled that correspond to the second SIM may include an additional lime amount of "x" added to expected processing times.

A third solution to the problems described above may also include increasing the RRC processing delay specified in REL-16 of specification. In particular, fora MUSIM device, task "$UE_{SIMA}$" performed with respect to SIM A (i.e., a first SIM of the MUSIM device) is given an extension of lime (i.e., an extension of time to the expected time to complete "$UE_{SIMA}$") "x %" where "x %" is the additional time to complete a higher priority processing activity corresponding to SIM B (i.e., a second SIM of the MUSIM device) referred to as task "$UE_{SIMB}$."

Accordingly, the NW may expect a given response time based on whether an applicable UB is an SSIM UE or a MUSIM UE. In addition, an expected RRC processing time may be sealed based on a number of SIMs supported by the UE (e.g., one SIM, two SIMs, three SIMs, and so forth). As such, the NW may continue to expect the RRC processing delay requirement to be the same as currently specified in Rel-16 version of the LTE and NR specifications for SSIM UEs. In contrast, for MUSIM UEs, the NW may extend the expected RRC processing delay by a factor of "x," as described above with respect to the third solution.

For dual active MUSIM UEs with dual transmitters (or a time multiplexed single transmitter), RRC processing limes also have to be higher than the expected limes outlined in current specifications (e.g., 16 ms) as the two connected mode SIMs may get RRC messages (via the baseband processor) from the NW at the same time, which will increase the processing delay for each SIM by as much time specified for a single RRC procedure in the current specifications (i.e., two SIMs in such a situation may include 16 ms for each SIM, resulting in an expected time of 32 ms).

An increase in processing time may also be based on: 1. The number of SIMs. For example, a UE having three SIMs may have a processing delay greater than a UE having two SIMs; 2. The operational mode. For instance, when all SIMs are in connected mode the processing delay will be greater than if only one SIM is in connected mode and the other SIM(s) are in idle mode. The following may apply regarding operational modes: a. When all SIMs are in idle mode, the idle mode procedures may be extended with an idle-idle extension factor; b. When a first SIM enters connected mode, the UE is to indicate supported modes (e.g., Connected-Idle, Connected-Connected, and so forth) when sending its capabilities to the NW. The UE may also send the current active mode (e.g., connected-idle) to allow the processing delay to be extended according to the current active mode; and c. When the second SIM enters connected mode, the UE may send a new signal to indicate to the NW that the operational mode has changed to "Connected-Connected." With respect to the second solution described herein, the NW may utilize "x" ms to determine the expected time for idle-idle mode, "y" ms to determine the expect time for connected-idle mode, and "z" ms for connected-connected mode where x<y<z. In an example, "x" may comprise 20 ms, "y" may comprise 40 ms, and "x" may comprise 60 ms In another example, "x" may comprise 10 ms, "y" may comprise 20 ms, and "x" may comprise 40 ms. Notably, however, these are examples only and any appropriate times may be utilized in place of the times described when practicing the principles described herein.

Furthermore, in addition to having larger additional time frames (i.e., the additional time frames referred to as "x," "y," and "z") for each additional SIM that is in a connected mode, the additional time frames may also get larger for each additional SIM that a MUSIM UE includes. For instance, a UE with three SIMs may have larger additional time frames than UEs with two SIMs, a UE with four SIMs may have larger additional time frames than UEs with three SIMs, and so forth.

Similarly, in an example related to the third solution described herein, the NW may utilize an extension of 20% to determine the expected time for idle-idle mode, an extension of 40% to determine the expected time for connected-idle mode, and an extension of 80% to determine the expected time for connected-connected mode. In another example, the NW may utilize an extension of 20% to determine the expected time for idle-idle mode, an extension of 40% to determine the expected time for connected-idle mode, and an extension of 60% to determine the expected time for connected-connected mode. Notably, however, these are examples only and any appropriate percentages may be utilized in place of the percentages described when practicing, the principles described herein.

Furthermore, in addition to having larger additional percentages of time for each additional SIM that is in a connected mode, the additional percentages of time may also get larger for each additional SIM that a MUSIM UE includes. For instance, a UE with three SIMs may have larger additional percentages of time than UEs with two SIMs, a UE with four SIMs may have larger additional percentages of time than UEs with three SIMs, and so forth.

In this way, ambiguity associated with MUSIM devices with respect to RRC processing time may be reduced/eliminated. In addition, because MUSIM UEs have not been Standardized architecture in earlier 3GPP releases, no consideration has been given to RRC processing time for multiple subscription single receive, dual receive, or dual transmit types of MUSIM capable UEs. With MUSIM UEs being considered for Rel-17, the principles described herein may allow MUSIM UE's to function properly without undue burden with respect to adhering to processing timelines that were originally defined for SSIM UEs. Furthermore, MUSIM UEs may be able to complete RRC procedures on connected mode SIMs within the newly defined RRC procedure delay in addition to maintaining good KPI/performance and user experience on idle mode SIMs of such MUSIM UEs.

Figure 3:
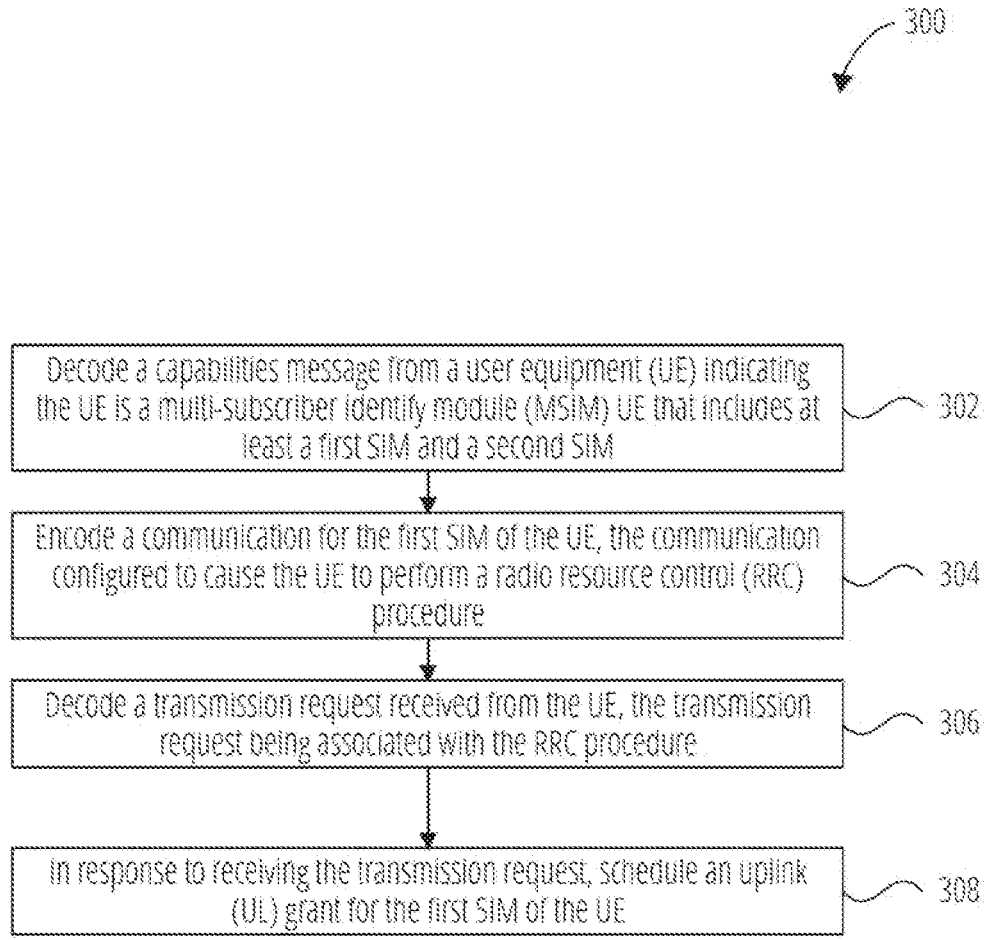
FIG. 3 illustrates a flowchart of a method for delaying RRC procedures at MUSIM UEs.

FIG. 3 illustrates a flowchart of a method 300 for delaying RRC procedures associated with MUSIM (or MSIM) devices. In block 302, the method 300 decodes a capabilities message from a user equipment (UE) indicating the UE is a multi-subscriber identify module (MSIM) UE that includes at least a first SIM and a second SIM. In an example, the capabilities message may also include a SIM mode associated with the multiple SIMs (e.g., connected-connected mode, idle-connected mode, idle-idle mode, and so forth) of the UE. In block 304, the method 300 encodes a communication for the first SIM of the UE, the communication configured to cause the UE to perform a radio resource control (RRC) procedure. For instance, the communication may comprise an RRC reconfiguration message.

In block 306, the method 300 decodes a transmission request received from the UE. The transmission request may be associated with the RRC procedure. For instance, the transmission request may comprise a scheduling request (SR) or RACH to inform the network that the first SIM is ready for a UL schedule grant. In block 308, the method 300 in response to receiving the transmission request, schedules in uplink (UL) grant for the first SIM of the UE. Accordingly, the network may be informed by the transmission request that the RRC procedure is ready to move forward and in response, schedules a UL grant for the first SIM of the UE.

Figure 4:
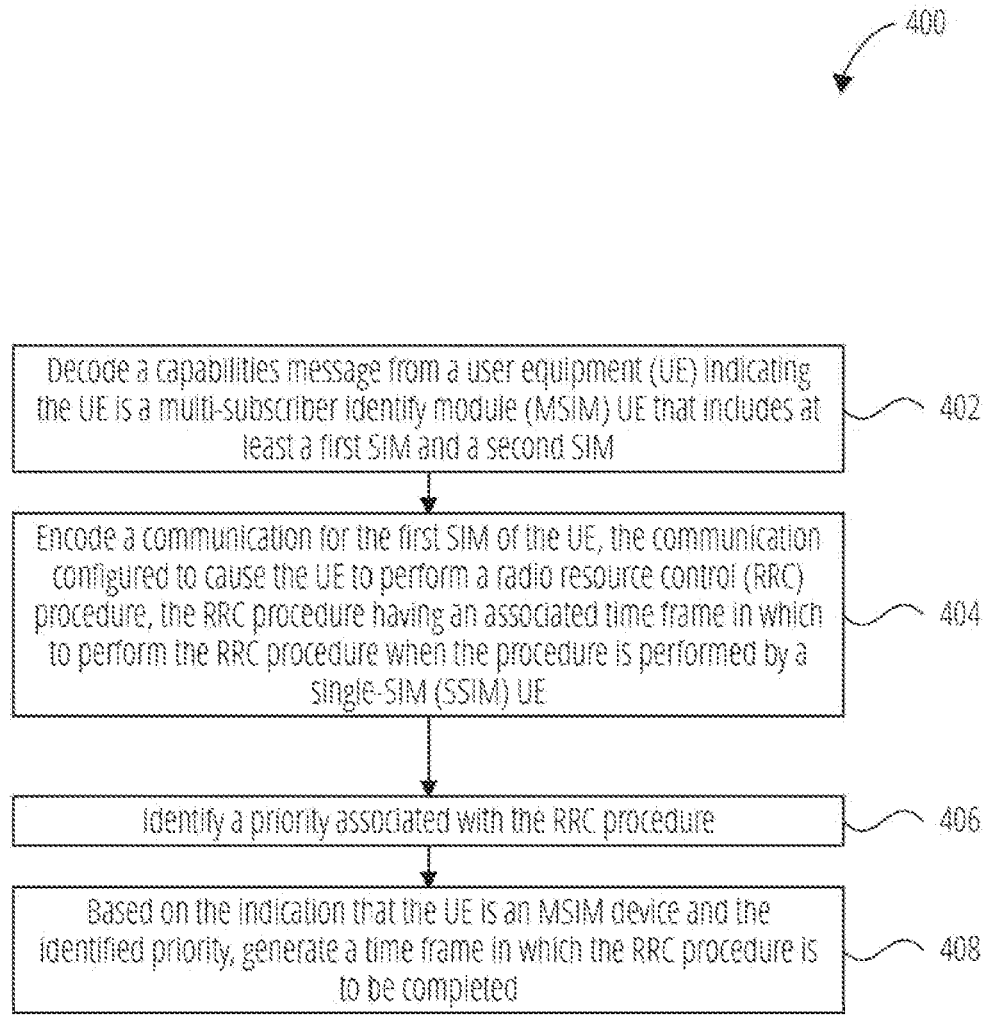
FIG. 4 illustrates a flowchart of a method for delaying RRC procedures at MUSIM UEs.

FIG. 4 illustrates a flowchart of a method 400 for delaying RRC procedures associated with MUSIM devices. In block 402, the method 400 decodes a capabilities message from a user equipment (UE) indicating the UE is a multi-subscriber identify module (MSIM) UE that includes at least a first SIM and a second SIM. In an example, the capabilities message may also include a SIM mode associated with the multiple SIMs (e.g., connected-connected mode, idle-connected mode, idle-idle mode, and so forth) of the UE.

In block 404, the method 400 encodes a communication for the first SIM of the UE. The communication is configured to cause the UE to perform a radio resource control (RRC) procedure. In addition, the RRC procedure may have an associated time frame in which to perform the RRC procedure when the procedure is performed by a single-SIM (SSIM) UE. For instance, the communication may comprise an RRC reconfiguration message in an NR network, which includes 16 ms expected time frame for an SSIM UE.

In block 406, the method 400 identifies a priority associated with the RRC procedure. For instance, the NW may prioritize initial security activation procedures and RRC re-establishment procedures over any procedures that may occur at the second SIM and interrupt the RRC procedure at the first SIM such that the expected time for such prioritized procedures is equal to the expected time for such procedures with respect to a SSIM UE.

In block 408, the method 400, based on the indication that the UE is an MSIM device and the identified priority, generates a time franc in which the RRC procedure is to be completed. For instance, the network may generate a time frame equal to the SSIM UE time frame if the RRC procedure is a security activation procedure or a RRC re-establishment procedure or add an additional pre-defined period of time for possible procedures at the second SIM that may interrupt the RRC procedure of the first SIM. In particular, the pre-defined period of time may comprise 20 ms, 40 ms, 60 ms, 80 ms, and so forth (i.e., as further described herein with respect to the second solution). Once again, however, such explicit additional pre-defined periods of time are for example purposes only, as any amount of time may be used to practice the principles described herein.

Figure 5:
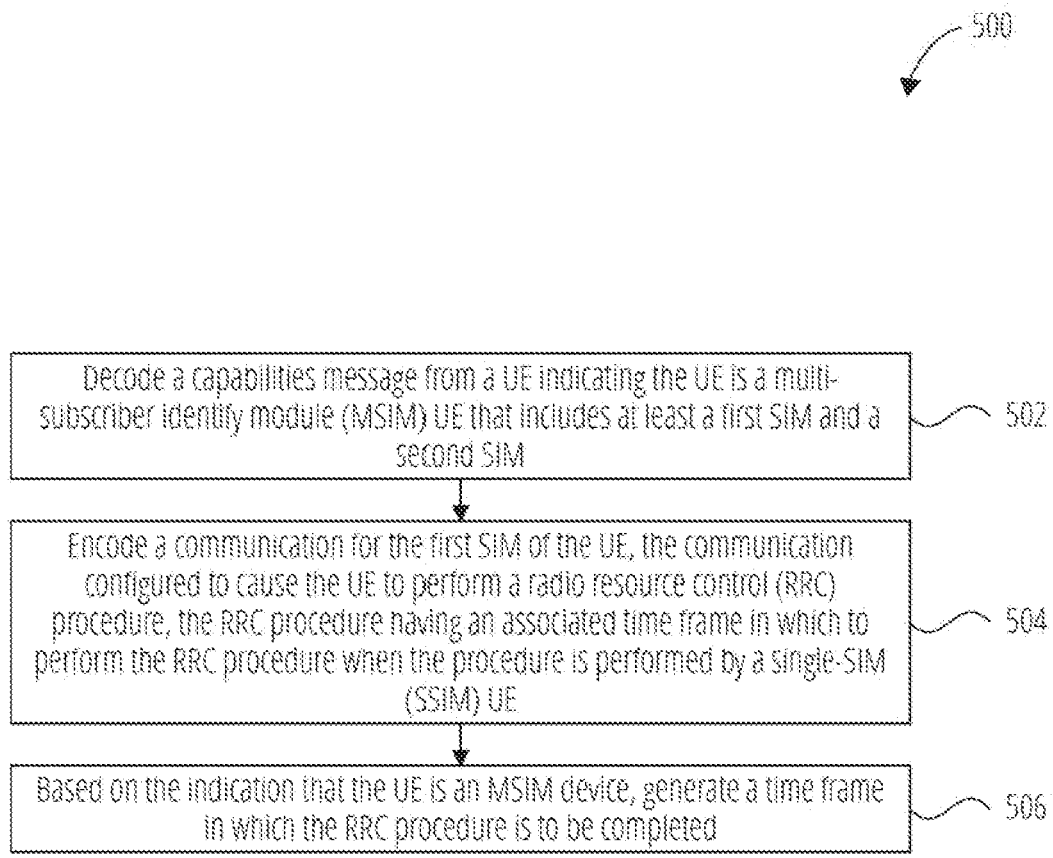
FIG. 5 illustrates a flowchart of a method for delaying RRC procedures at MUSIM UEs.

FIG. 5 illustrates a flowchart of a method 500 for delaying RRC procedures associated with MUSIM devices. In block 502, the method 500 decodes a capabilities message from a UE indicating the UE is a multi-subscriber identify module (MSIM) UE that includes at least a first SIM and a second SIM. In an example, the capabilities message may also include a SIM mode associated with the multiple SIMs (e.g., connected-connected mode, idle-connected mode, idle-idle mode, and so forth) of the UE. In block 504, the method 500 encodes a communication for the first SIM of the UE. The communication is configured to cause the UE to perform a radio resource control (RRC) procedure. The RRC procedure has an associated time frame in which to perform the RRC procedure when the procedure is performed by a single-SIM (SSIM) UE. For instance, the communication may comprise an RRC reconfiguration message, which includes 16 ms expected time frame for an SSIM UE.

In block 506, the method 500, based on the indication that the UE is an MSIM device, generates a time frame in which the RRC procedure is to be completed. For instance, the network may generate a time frame equal to the SSIM UE time frame when the UE only includes a single SIM. In contrast, the NW may add an additional percentage of time (i.e., an additional percentage of the time frame in which the procedure is expected to be completed for an SSIM UE, as further described herein with respect to the third solution) for each additional SIM of an MUSIM UE as possible procedures at the additional SIMs (i.e., the second SIM, third SIM, and so forth) may interrupt the RRC procedure of the first SIM.

Figure 6:
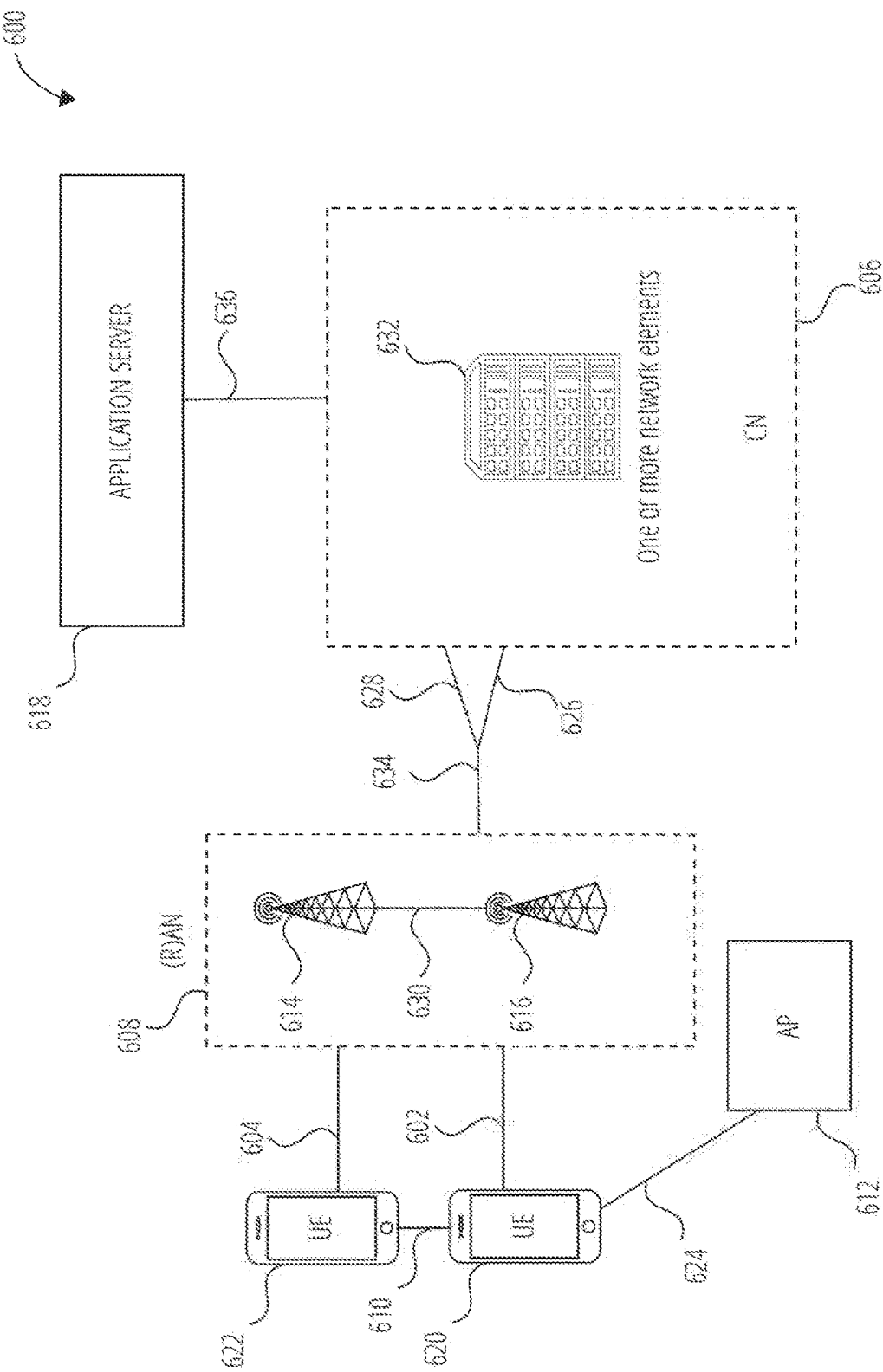
FIG. 6 illustrates a system in accordance with one embodiment.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 622 and UE 620. In this example, the UE 622 and the UE 620 are illustrated as smartphones (e.g., handheld touchscreen mobile computing devices connectable to one or inure cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 622 and/or the UE 620 may be IoT UEs, which may comprise a network access layer designed for tow power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connectors of the IoT network.

The UE 622 and UE 620 may be configured to connect, for example, communicatively couple, with an access node or radio access node (shown 3S (R)AN 608). In embodiments, the (R)AN 608 may be an NG RAN or a SG RAN, an E-UTRAN, or a legacy RAN, such as a UTRAN or GERAN. As used herein, the term "NG RAN" or the like may refer to a (R)AN 608 that operates in an NR or SG system, and the term "E-UTRAN" or the like may refer to a (R)AN 608 that operates in an LTE or 4G system. The UE 622 and UE 620 utilize connections (or channels) (shown as connection 604 and connection 602, respectively), each of which comprises a physical communications interface or layer (discussed in further detail below).

In this example, the connection 604 and connection 602 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 622 and UE 620 may directly exchange communication data via a ProSe interface 610. The ProSe interface 610 may alternatively be referred to as a sidelink (SL) interface 110 and may comprise one or more logical channels, including but not limited to a PSCCH, a PSSCH, a PSDCH, and a PSBCH.

The UE 620 is shown to be configured to access an AP 612 (also referred to as "WLAN node," "WLAN," "WLAN Termination," "WT" or the like) via connection 624. The connection 624 can comprise a local wireless connection, such as a connection consistent with any IEEE 802.11 protocol, wherein the AP 612 would comprise a wireless fidelity (Wi-Fi®) router. In this example, the AP 612 may be connected to the Internet without connecting to the core network of the wireless system (described in further detail below). In various embodiments, the UE 620, (R)AN 608, and AP 612 may be configured to utilize LWA operation and or LWIP operation. The LWA operation may involve the UE 620 in RRC_CONNECTED being configured by the RAN node 614 or the RAN node 616 to utilize radio resources of LTE and WLAN. LWIP operation may involve the UE 620 using WLAN radio resources (e.g., connection 624) via IPsec protocol tunneling to authenticate and encrypt packets (e.g., IP packets) sent over the connection 624. IPsec tunneling may include encapsulating the entirety of original IP packets and adding a new packet header, thereby protecting the original header of the IP packets.

The (R)AN 608 can include one or more AN nodes, such as RAN node 614 and RAN node 616, that enable the connection 604 and connection 602. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 600 (e.g., an eNB). According to various embodiments, the RAN node 614 or RAN node 616 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 614 or RAN node 616 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 614 or RAN node 616); a MAC/PHY split wherein RRC, PDCP, RLC, and MAC layers are operated by the CRAN/vBBUP and the PHY layer is operated by individual RAN nodes (e.g., RAN node 614 or RAN node 616); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 614 or RAN node 616 to perform other virtualized applications. In some implementations, an individual RAN node may represent individual gNB-DUs that are connected to a gNB-CU via individual F1 interfaces (not shown by FIG. 6). In these implementations, the gNB-DUs may include one or more remote radio heads or RFEMs, and the gNB-CU may be operated by a server that is located in the (R)AN 608 (not shown) or by a server pool in a similar manner as the CRAN/vBBUP. Additionally, or alternatively, one or more of the RAN node 614 or RAN node 616 may be next generation eNBs (ng-eNBs), which are RAN nodes that provide E-UTRA user plane and control plane protocol terminations toward the UE 622 and UE 620, and are connected to an SGC via an NC interface (discussed infra). In V2X scenarios one or more of the RAN node 614 or RAN node 616 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 614 and or the RAN node 616 can terminate the air interface protocol and can be the first point of contact for the UE 622 and UE 620. In some embodiments, the RAN node 614 and/or the RAN node 616 can fulfill various logical functions for the (R)AN 608 including, but not limited to, radio network controller (RNC) functions such as radio bearer management, uplink and downlink dynamic radio resource management and data packet scheduling, and mobility management.

In embodiments, the UE 622 and UE 620 can be configured to communicate using OFDM communication signals with each other or with the RAN node 614 and/or the RAN node 616 over a multicarrier communication channel in accordance with various communication techniques, such as but not limited to, an OFDM A communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 614 and/or the RAN node 616 to the UE 622 and UE 620, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 622 and UE 620 and the RAN node 614 and/or the RAN node 616 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 622 and UE 620 and the RAN node 614 or RAN node 616 may operate using LAA, eLAA, and or feLAA mechanisms. In these implementations, the UE 622 and UE 620 and the RAN node 614 or RAN node 616 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 622 and UE 620, RAN node 614 or RAN node 616, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks, ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 622, AP 612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure tor DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs car be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidth of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 622 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 622 and UE 620. The PDCCH carries information about the transport format and resource allocations related to the PDSCH channel, among other things. It may also inform the UE 622 and UE 620 about the transport format, resource allocation, and HARQ information related to the uplink shared channel. Typically, downlink scheduling (assigning control and shared channel resource blocks to the UE 620 within a cell) may be performed at any of the RAN node 614 or RAN node 616 based on channel quality information fed back from any of the UE 622 and UE 620. The downlink resource assignment information may be sent on the PDCCH used for (e.g., assigned to) each of the UE 622 and UE 620.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 614 or RAN node 616 may be configured to communicate with one another via interface 630. In embodiments where the system 600 is an LTE system (e.g., when CN 606 is an EPC), the interface 630 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred front a MeNB to an SeNB; information about successful in sequence delivery of PDCP PDUs to a UE 622 from an SeNB for user data; information of PDCP PDUs that were not delivered to a UE 622; information about a current minimum desired buffer size at the Se NB for transmitting to the UE user data; and the like. The X2-C may provide intra-LTR access mobility functionality, including context transfers from source to target eNBs, user plane transport control, etc.; load management functionality; as well as inter-cell interference coordination functionality.

In embodiments where the system 600 is a SG or NR system (e.g., when CN 606 is an SGC), the interface 630 may be an Xn interface. The Xn interface is defined between two or more RAN nodes (e.g., two or more gNBs and the like) that connect to SGC, between a RAN node 614 (e.g., a gNB) connecting to SGC and an eNB, and/or between two eNBs connecting to 5GC (e.g., CN 606). In some implementations, the Xn interface may include an Xn user plane (Xn-U) interface and an Xn control plane (Xn-C) interface. The Xn-U may provide non-guaranteed delivery of user plane PDUs and support provide data forwarding and flow control functionality. The Xn-C may provide management and error handling functionality, functionality to manage the Xn-C interface; mobility support for UE 622 in a connected mode (e.g., CM-CONNECTED) including functionality to manage the UE mobility for connected mode between one or more RAN node 614 or RAN node 616. The mobility support may include context transfer from an old (source) serving RAN node 614 to new (target) serving RAN node 616; and control of user plane tunnels between old (source) serving RAN node 614 to new (target) serving RAN node 616. A protocol stack, of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and or the Xn-C protocol stack may be same or similar to the user plane and/or control plane protocol stack(s) shown and described herein.

The (R)AN 608 is shown to be communicatively coupled to a core network—in this embodiment, CN 606. The CN 606 may comprise one or more network elements 632, which are configured to offer various data and telecommunications services to customers subscribers (e.g., users of UE 622 and UE 620) who are connected to the CN 606 via the (R)AN 608. The components of the CN 606 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 606 may be referred to as a network slice, and a logical instantiation of a portion of the CN 606 may be referred to as a network sub-slice, NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components.

Generally, an application server 618 may be an element offering applications that use IP bearer resources with the core network (e.g., UMTS PS domain, LTE PS data services, etc.). The application server 618 can also be configured to support one or more communication services (e.g., VoIP sessions, PTT sessions, group communication sessions, social networking services, etc.) for the UE 622 and UE 620 via the EPC. The application server 618 may communicate with the CN 606 through an IP communications interface 636.

In embodiments, the CN 606 may be an SGC, and the (R)AN 116 may be connected with the CN 606 via an NG interface 634. In embodiments, the NG interface 634 may be split into two parts, an NG user plane (NG-U) interface 626, which carries traffic data between the RAN node 614 or RAN node 616 and a CPF, and the S1 control plane (NG-C) interface 628, which is a signaling interface between the RAN node 614 or RAN node 616 and AMFs.

In embodiments, the CN 606 may be a SG CN, while in other embodiments, the CN 606 may be an EPC). Where CN 606 is an EPC, the (R)AN 116 may be connected with the CN 606 via an S1 interface 634. In embodiments, the S1 interface 634 may be split into two parts, an S1 user plane (S1-U) interface 626, which carries traffic data between the RAN node 614 or RAN node 616 and the S-GW, and the S1-MME interface 628, which is a signaling interface between the RAN node 614 or RAN node 616 and MMEs.

Figure 7:
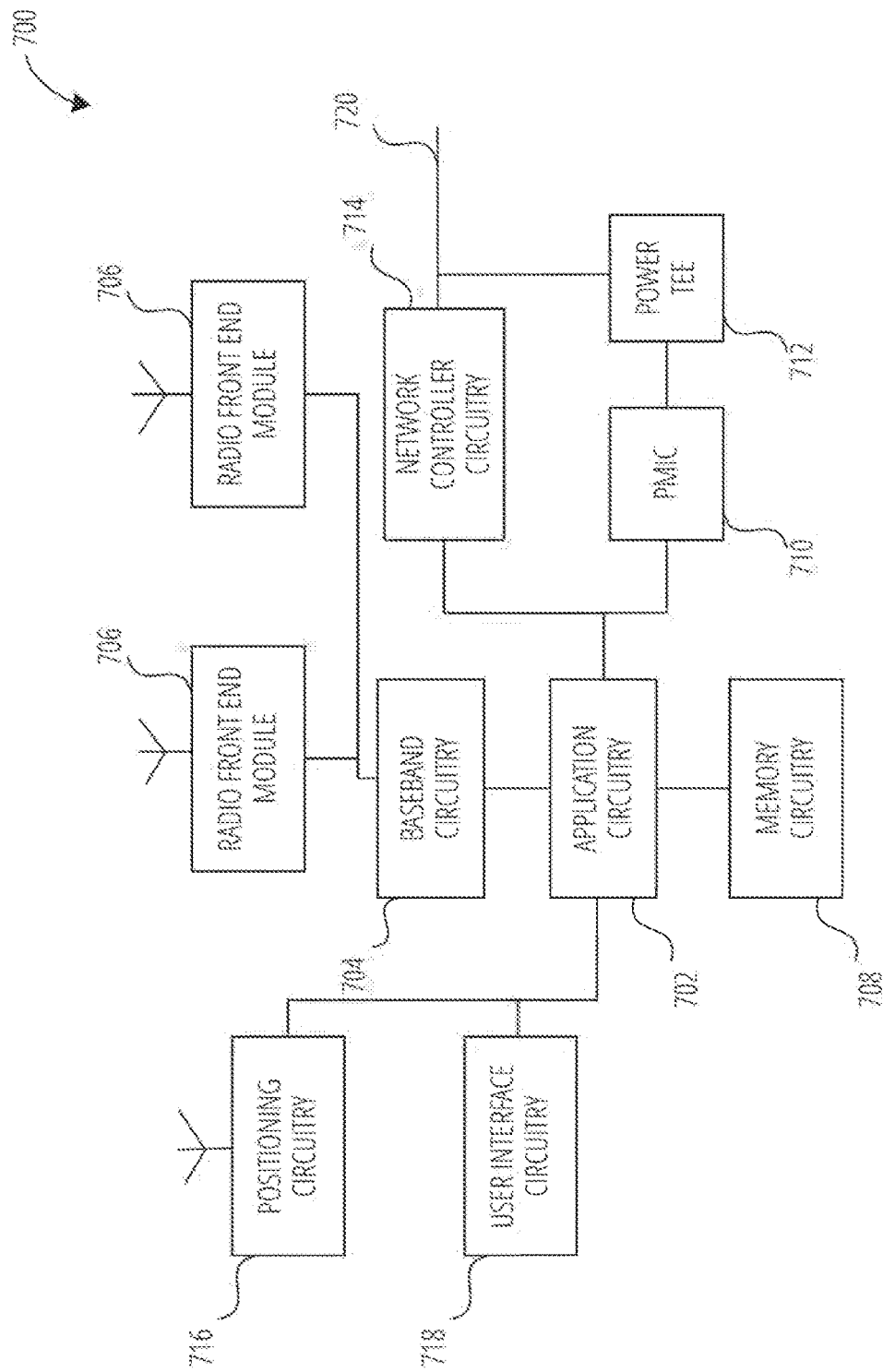
FIG. 7 illustrates an infrastructure equipment in accordance with one embodiment.

FIG. 7 illustrates an example of infrastructure equipment 700 in accordance with various embodiments. The infrastructure equipment 700 may be implemented as a base station, radio head, RAN node, AN, application server, and or any other element/device discussed herein. In other examples, the infrastructure equipment 700 could be implemented in or by a UE.

The infrastructure equipment 700 includes application circuitry 702, baseband circuitry 704, one or more radio front end module 706 (RFEM), memory circuitry 708, power management integrated circuitry (shown as PMIC 710), power tee circuitry 712, network controller circuitry 714, network interface connector 720, satellite positioning circuitry 716, and user interface circuitry 718. In some embodiments, the device infrastructure equipment 700 may include additional elements such as, for example, memory storage, display, camera, sensor, or input-output (I/O) interface. In other embodiments, the components described below may be included in more than one device. For example, said circuitries may be separately included in more than one device for CRAN, vBBU, or other like implementations. Application circuitry 702 includes circuitry such as, but not limited to one or more processors (or processor cores), cache memory, and one or more of low-drop-out voltage regulators (LDOs), interrupt controllers, serial interfaces such as SPI, I²C or universal programmable serial interface module, real time clock (RTC), timer-counters including interval and watchdog tuners, general purpose input output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors for cores) of rite application circuitry 702 may be coupled with or may include memory/storage elements and may be configured to execute instructions stored in the memory/storage to enable various applications or operating systems to run on the infrastructure equipment 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 702 may comprise, or may be, a special-purpose processor/control let to operate according to the various embodiments herein. As examples, the processor(s) of application circuitry 702 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Worrier P-class processors; and/or the like. In some embodiments, the infrastructure equipment 700 may not utilize application circuitry 702, and instead may include a special-purpose processor/controller to process IP data received from an EPC or 5GC, for example.

In some implementations, the application circuitry 702 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 702 may comprise logic blocks or logic fabric, and other interconnected resources that may be programmed to perform various functions, such as the procedures, methods, functions, etc. of the various embodiments discussed herein In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc in look-up-tables (LUTs) and the like. The baseband circuitry 704 may be implemented, for example, as a solder-down substrate including one or more integrated circuits, a single packaged integrated circuit soldered to a main circuit board or a multi-chip module containing two or more integrated circuits.

The user interface circuitry 718 may include one or more user interfaces designed to enable user interaction with the infrastructure equipment 700 or peripheral component interfaces designed to enable peripheral component interaction with the infrastructure equipment 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to a nonvolatile memory port, a universal serial bus (USB) port, an audio jack, a power supply interface, etc.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and Sub-mmWave.

The memory circuitry 708 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 708 may be implemented as one or more of solder down packaged integrated circuits, socketed memory modules and plug-in memory cards.

The PMIC 710 may include voltage regulators, surge protectors, power alarm detection circuitry, and one or more backup power sources such as a battery or capacitor. The power alarm detection circuitry may detect one or mere of brown out (under-voltage) and surge (over-voltage) conditions. The power tee circuitry 712 may provide for electrical power drawn from a network cable to provide both power supply and data connectivity to the infrastructure equipment 700 using a single cable.

The network controller circuitry 714 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 720 using a physical connection, which may be electrical (commonly referred to as a "copper interconnect"), optical, or wireless. The network controller circuitry 714 may include one or more dedicated processors and or FPGAs to communicate using one or more of the aforementioned protocols. In some implementations, the network controller circuitry 714 may include multiple controllers to provide connectivity to other networks using the same or different protocols.

The positioning circuitry 716 includes circuitry to receive and decode signals transmitted/broadcasted by a positioning network of 3 global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning integrated by Satellite (DORIS), etc.), or the like. The positioning circuitry 716 comprises various hardware elements (e.g., including hardware devices such as switches, filters, amplifiers, antenna elements, and the like to facilitate OTA communications) to communicate with components of a positioning network, such as navigation satellite constellation nodes, in some embodiments, the positioning circuitry 716 may include a Micro-Technology tor Positioning, Navigation, and Timing (Micro-PNT) IC that uses a master timing clock to perform position tracking estimation without GNSS assistance. The positioning circuitry 716 may also be part of, or interact with, the baseband circuitry 704 and/or radio front end module 706 to communicate with the nodes and components of the positioning network. The positioning circuitry 716 may also provide position data and/or time data to the application circuitry 702, which may use the data to synchronize operations with various infrastructure, or the like. The components shown by FIG. 7 may communicate with one another using interface circuitry, which may include any number of bus and or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 8:
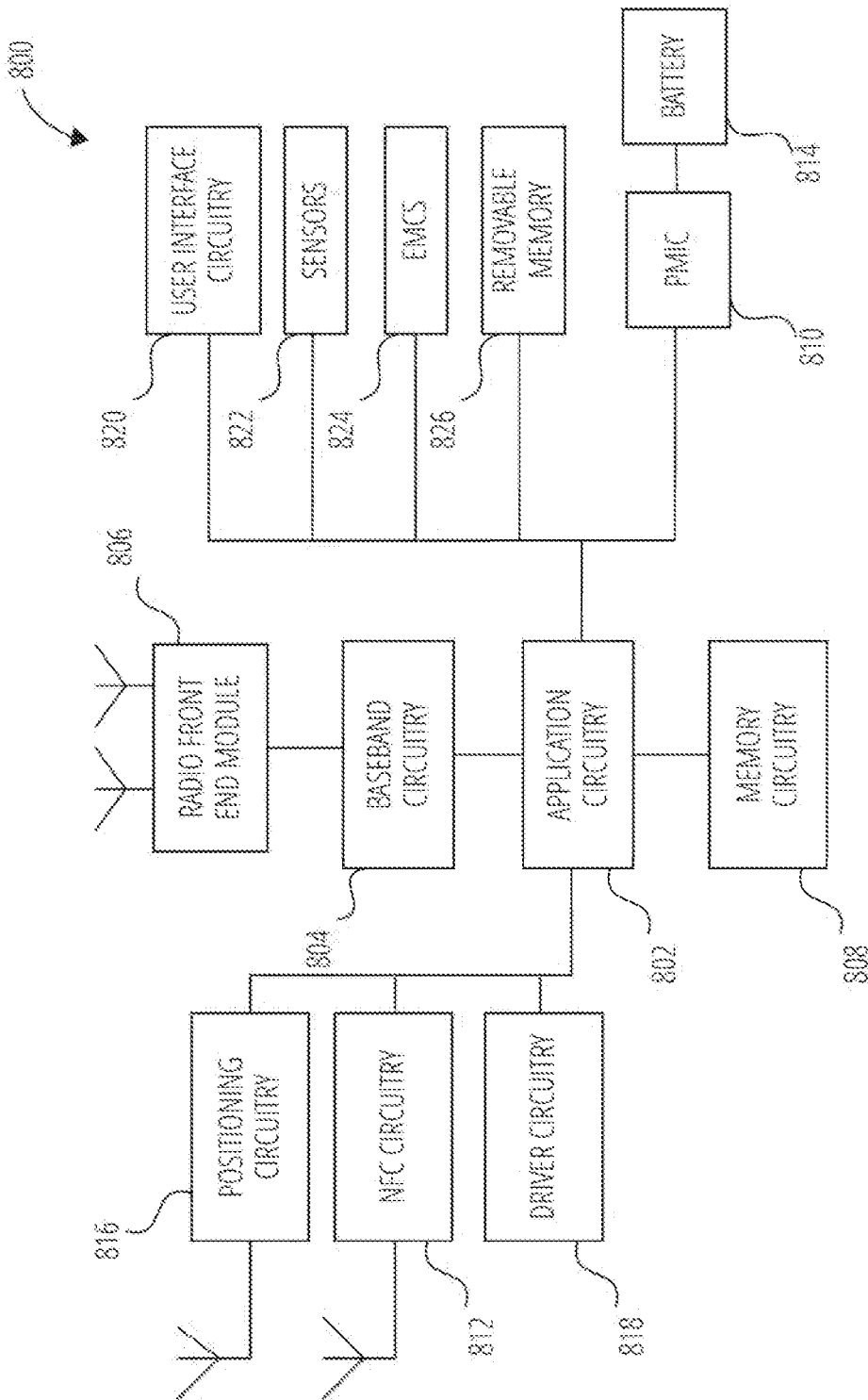
FIG. 8 illustrates a platform in accordance with one embodiment.

FIG. 8 illustrates an example of a platform 800 in accordance with various embodiments. In embodiments, the computer platform 800 may be suitable for use as UEs, application servers, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 802 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 802 may be coupled with or may include memory/storage elements and may be configured to execute instructions stored in the memory/storage to enable various applications or operating systems to run on the platform 800. In some implementations, the memory/storage elements may be on-chip memory circuitry, which may include any suitable volatile and or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 802 may comprise, or may be, a special-purpose processor/controller to operate according to the various embodiments herein.

As examples, the processor(s) of application circuitry 802 may include an Intel® Architecture Core™ based processor, such as a Quark™, an Atom™, an i3, an i5, an i7, or an MCU-class processor, or another such processor available from Intel® Corporation. The processors of the application circuitry 802 may also be one or more of Advanced Micro Devices (AMD) Ryzen® processor(s) or Accelerated Processing Units (APUs); AS-A9 processor(s) from Apple® Inc., Snapdragon™ processors) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 802 may be a part of a system on a chip (SoC) in which the application circuitry 802 and other components are formed into a single integrated circuit, or a single package, such as the Edison™ or Galileo™ SoC boards from Intel® Corporation.

Additionally or alternatively, application circuitry 802 may include circuitry such as, but not limited to, one or mote a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 804 may be implemented, for example, as a solder-down substrate including one or more integrated circuits, a single packaged integrated circuit soldered to a main circuit board or a multi-chip module containing two or more integrated circuits.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio from end module 806, which incorporates both mmWave antennas and sub-mmWave.

The memory circuitry 808 may include any number and type of memory devices used to provide for a given amount of system memory. As examples, the memory circuitry 808 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 808 may be developed in accordance with a Joint Electron Devices Engineering Council (JEDEC) low power double data rate (LPDDR)-based design, such as LPDDR2, LPDDR3, LPDDR4, or the like. Memory circuitry 808 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 808 maybe on-die memory or registers associated with the application circuitry 802. To provide for persistent storage of information such as data, applications, operating systems and so forth, memory circuitry 808 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 800 may incorporate the three-dimensional (3D) cross-point (XPOINT) memories from Intel® and Micron®.

The removable memory 826 may include devices, circuitry, enclosures housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 801. The external devices connected to the platform 800 via the interface circuitry include sensors 822 and electro-mechanical components (shown as EMCs 824), as well as removable memory devices coupled to removable memory 826.

The sensors 822 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 824 include devices, modules, or subsystems whose purpose is to enable platform 800 to change its state, position, and/or orientation, or move or control a mechanism or (sub)system. Additionally, EMCs 824 may be configured to generate and send messages/signaling to other components of the platform 800 to indicate a current stale of the EMCs 824. Examples of the EMCs 824 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 824 based on one or more captured events and/or instructions or control signals received from a service provider and/or various clients. In some implementations, the interface circuitry may connect the platform 800 with positioning circuitry 816. The positioning circuitry 816 includes circuitry to receive and decode signals transmitted broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.; or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-PNT IC that uses a master timing clock to perform position tracking estimation without GNSS assistance. The positioning, circuitry 816 may also be part of, or interact with, the baseband circuitry 804 and/or radio front end module 806 to communicate with the nodes and components of the positioning network. The positioning circuitry 816 may also provide position data and or time data to the application circuitry 802, which may use the data to synchronize operations with various infrastructure (e.g., radio base stations), for turn-by-turn navigation applications, or the like.

In some implementations, the interface circuitry may connect the platform 800 with Near-Field Communication circuitry (shown as NFC circuitry 812). The NFC circuitry 812 is configured to provide contactless, short-range communications based on radio frequency identification (RFID) standards, wherein magnetic field induction is used to enable communication between NFC circuitry 812 and NFC-enabled devices external to the platform 800 (e.g., an "NFC touchpoint"). NFC circuitry 812 comprises an NFC controller coupled with an antenna element and a processor coupled with the NFC controller. The NFC controller may be a chip/IC providing NFC functionalities to the NFC circuitry 812 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 812, or initiate data transfer between the NFC circuitry 812 and another active NFC device (e.g., a smartphone or an NFC-enabled POS terminal) that is proximate to the platform 800.

The driver circuitry 818 may include software and hardware elements that operate to control particular devices that are embedded in the platform 800, attached to the platform 800, or otherwise communicatively coupled with the platform 800. The driver circuitry 818 may include individual drivers allowing other components of the platform 800 to interact with or control various input output (I/O) devices that may be present within, or connected to, the platform 800. For example, driver circuitry 818 may include a display driver to control and allow access to a display device, a touchscreen driver to control and allow access to a touchscreen interface of the platform 800, sensor drivers to obtain sensor readings of sensors 822 and control and allow access to sensors 822, EMC drivers to obtain actuator positions of the EMCs 824 and/or control and allow access to the EMCs 824, a camera driver to control and allow access to an embedded image capture device, audio drivers to control and allow access to one or more audio devices.

The power management integrated circuitry (shown as PMIC 810) (also referred to as "power management circuitry") may manage power provided to various components of the platform 800. In particular, with respect to the baseband circuitry 804, the PMIC 810 may control power-source selection, voltage scaling, battery charging, or DC-to-DC conversion. The PMIC 810 may often be included when the platform 800 is capable of being powered by a battery 814, for example, when the device is included in a UE.

In some embodiments, the PMIC 810 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 814 may power the platform 800, although in some examples the platform 800 may be mounted deployed in a fixed location, and may have a power supply coupled to an electrical grid. The battery 814 may be a lithium ion battery, a metal-air battery, such as a zinc-air battery, an aluminum-air battery, a lithium-air battery, and the like. In some implementations, such as in V2X applications, the battery 814 may be a typical lead-acid automotive battery.

In some implementations, the battery 814 may be a "smart battery," which includes or is coupled with a Battery Management System (BMS) or battery monitoring integrated circuitry. The BMS may be included in the platform 800 to track the state of charge (SoCh) of the battery 814. The BMS may be used to monitor other parameters of the battery 814 to provide failure predictions, such as the state of health (SoH) and the state of function (SoF) of the battery 814. The BMS may communicate the information of the battery 814 to the application circuitry 802 or other components of the platform 800. The BMS may also include an analog-to-digital (ADC) convertor that allows the application circuitry 802 to directly monitor the voltage of the battery 814 or the current flow from the battery 814. The battery parameters may be used to determine actions that the platform 800 may perform, such as transmission frequency, network operation, sensing frequency, and the like.

A power block, or other power supply coupled to an electrical grid may be coupled with the BMS to charge the battery 814. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 814, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 820 includes various input output (I/O) devices present within, or connected to the platform 800, and includes one or more user interfaces designed to enable user interaction with the platform 800 and/or peripheral component interfaces designed to enable peripheral component interaction with the platform 800. The user interface circuitry 820 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator positions), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensors 822 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 9:
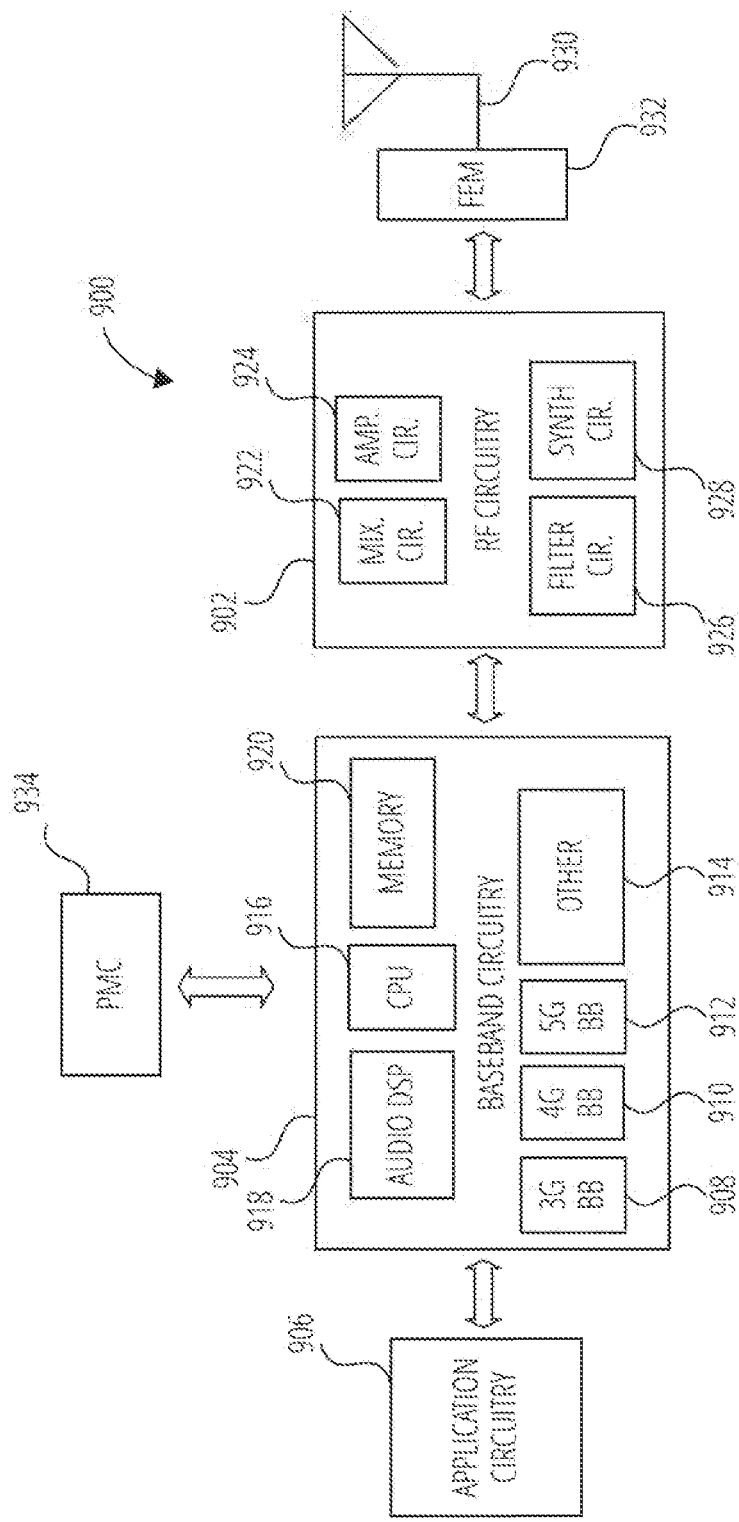
FIG. 9 illustrates a device in accordance with one embodiment.

FIG. 9 illustrates example components of a device 900 in accordance with some embodiments. In some embodiments, the device 900 may include application circuitry 906, baseband circuitry 904, Radio Frequency (RF) circuitry (shown as RF circuitry 902), front-end module (FEM) circuitry (shown as FEM circuitry 932), one or more antennas 930, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 906, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 906 may include one or more application processors. For example, the application circuitry 906 may include circuitry such as, but not limited to, one or more single-core or multi-core processors. The processor(s) may include any combination of general-purpose processors and dedicated processors (e.g., graphics processors, application processors, etc.). The processors may be coupled with or may include memory storage and may be configured to execute instructions stored in the memory/storage to enable various applications or operating systems to run on the device 900. In some embodiments, processors of application circuitry 906 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 902 and to generate baseband signals for a transmit signal path of the RF circuitry 902. The baseband circuitry 904 may interface with the application circuitry 906 for generation and processing of the baseband signals and for controlling operations of the RF circuitry 902. For example, in some embodiments, the baseband circuitry 904 may include a third generation (3G) baseband processor (3G baseband processor 908), a fourth generation (4G) baseband processor (4G baseband processor 910), a fifth generation (5G) baseband processor (5G baseband processor 912), or other baseband processors) 914 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 902. In other embodiments, some or all of the functionality of the illustrated baseband processors may be included in modules stored in the memory 920 and executed via a Central Processing Unit (CPU 916). The radio control functions may include, but are not limited to, signal modulation demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Cheek (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 918. The one or more audio DSP(s) 918 may include elements for compression decompression and echo cancellation and may include other suitable processing elements in other embodiments. Components of the baseband circuitry may be suitably combined in a single chip, a single chipset, or disposed on a same circuit board in some embodiments In some embodiments, some or all of the constituent components of the baseband circuitry 904 and the application circuitry 906 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 902 may enable communication with wireless networks using modulated electromagnetic radiation through a non-solid medium. In various embodiments, the RF circuitry 902 may include switches, filters, amplifiers, etc. to facilitate the communication with the wireless network. The RF circuitry 902 may include a receive signal path which may include circuitry to down-convert RF signals received from the FEM circuitry 932 and provide baseband signals to the baseband circuitry 904. The RF circuitry 902 may also include a transmit signal path which may include circuitry to up-convert baseband signals provided by the baseband circuitry 904 and provide RF output signals to the FEM circuitry 932 for transmission.

In some embodiments, the receive signal path of the RF circuitry 902 may include mixer circuitry 922, amplifier circuitry 924 and filter circuitry 926. In some embodiments, the transmit signal path of the RF circuitry 902 may include filter circuitry 926 and mixer circuitry 922. The RF circuitry 902 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 932 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for firmer processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 932. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 902 may include analog-to-digital converter (ADC) and digital-to-analog converter (DAC) circuitry and the baseband circuitry 904 may include a digital baseband interface to communicate with the RF circuitry 902.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 902 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 906 (such as an applications processor) depending on the desired output frequency. In some embodiments, a divider control input (e.g., N) may be determined from a look-up table based on a channel indicated by the application circuitry 906.

Synthesizer circuitry 928 of the RF circuitry 902 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 902 may include an IQ/polar converter.

The FEM circuitry 932 may include a receive signal path which may include circuitry configured to operate on RF signals received from one or more antennas 930, amplify the received signals and provide the amplified versions of the received signals to the RF circuitry 902 for further processing. The FEM circuitry 932 may also include a transmit signal path which may include circuitry configured to amplify signals for transmission provided by the RF circuitry 902 for transmission by one or more of the one or more antennas 930. In various embodiments, the amplification through the transmit or receive signal paths may be done solely in the RF circuitry 902, solely in the FEM circuitry 932, or in both the RF circuitry 902 and the FEM circuitry 932.

In some embodiments, the FEM circuitry 932 may include a TX/RX switch to switch between transmit mode and receive mode operation. The FEM circuitry 932 may include a receive signal path and a transmit signal path. The receive signal path of the FEM circuitry 932 may include an LNA to amplify received RF signals and provide the amplified received RF signals as an output (e.g., to the RF circuitry 902) The transmit signal path of the FEM circuitry 932 may include a power amplifier (PA) to amplify input RF signals (e.g., provided by the RF circuitry 902), and one or more filters to generate RF signals for subsequent transmission (e.g., by one or more of the one or more antennas 930).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for other components such as, but not limited to, the application circuitry 906, the RF circuitry 902, or the FEM circuitry 932.

In some embodiments, the PMC 934 may control, or otherwise be pan of, various power saving mechanisms of the device 900. For example, if the device 900 is in an RRC_Connected state, where it is still connected to the RAN node as it expects to receive traffic shortly, then it may enter a state known as Discontinuous Reception Mode (DUX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 906 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 906 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
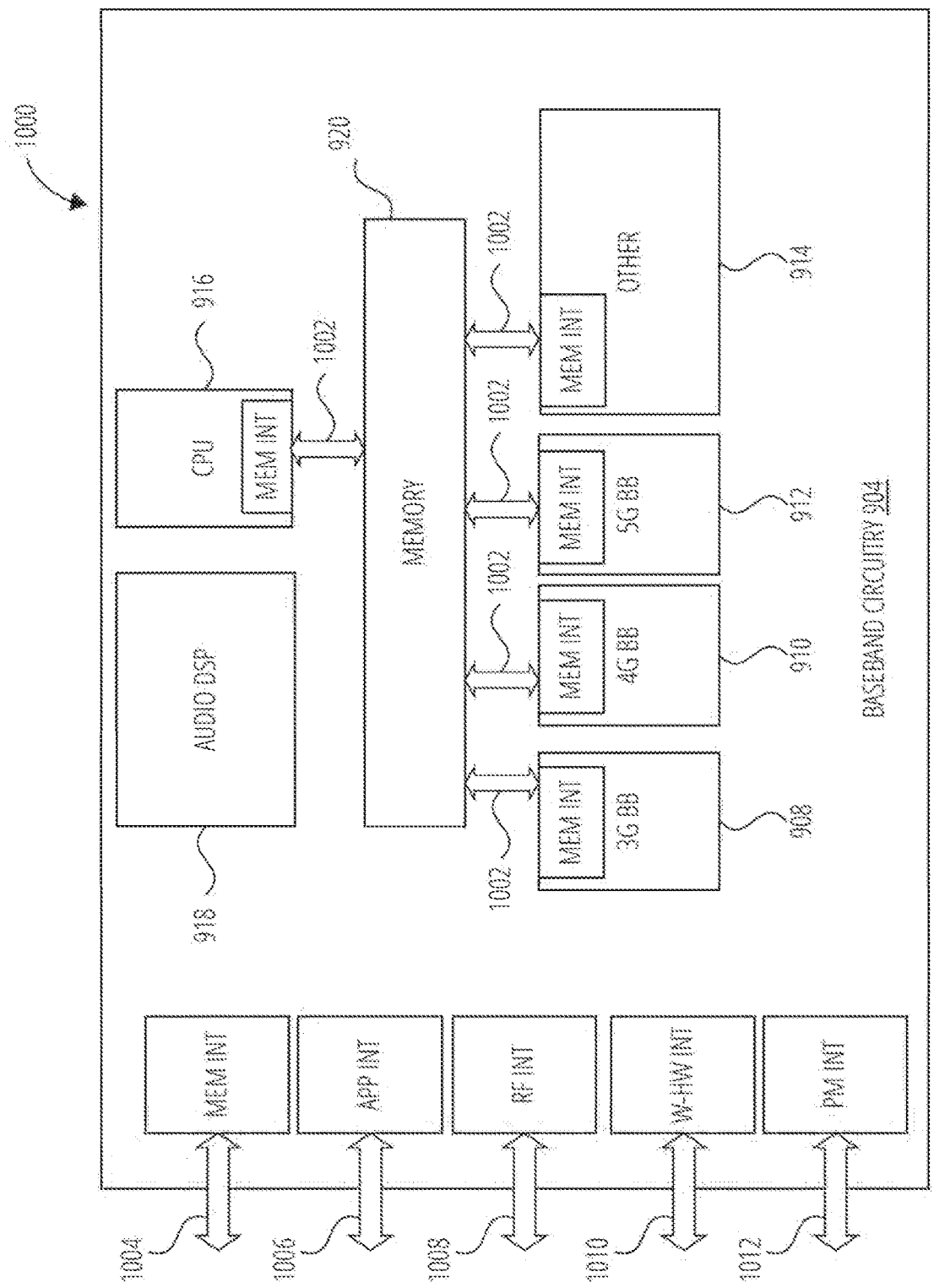
FIG. 10 illustrates example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 908, 4G baseband processor 910, 5G baseband processor 912, other baseband processor(s) 914, CPU 916, and a memory 920 utilized by said processors. As illustrated, each of the processors may include a respective memory interface 1002 to send/receive date to/from the memory 920.

The baseband circuitry 904 may further include one or more interfaces to communicatively couple to other circuitries/devices, such as a memory interlace 1004 (e.g., an interface to send/receive data to from memory external to the baseband circuitry 904), an application circuitry interface 1006 (e.g., an interface to send receive data to/from the application circuitry 906 of FIG. 9), an RF circuitry interface 1008 (e.g., an interface to send/receive data to from RF circuitry 902 of FIG. 9), a wireless hardware connectivity interface 1010 (e.g., an interface to send/receive data to from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
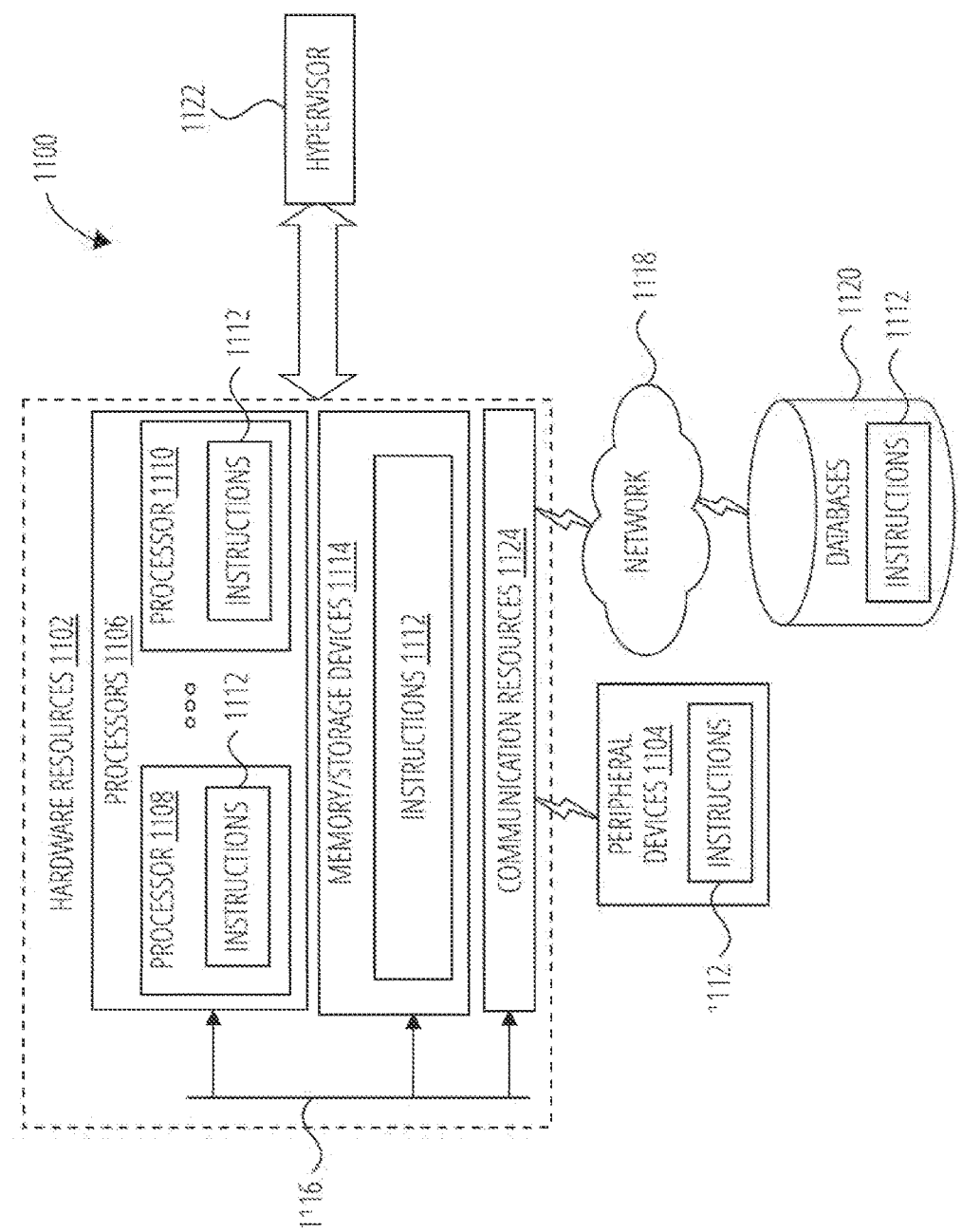
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices, sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include a method for wireless communication by a network, comprising: decoding a capabilities message from a user equipment (UE) indicating the UE is a multi-subscriber identify module (MSIM) UE that includes at least a first SIM and a second SIM; encoding a communication for the first SIM of the UE, the communication configured to cause the UE to perform a radio resource control (RRC) procedure; decoding a transmission request received from the UE, the transmission request being associated with the RRC procedure; and in response to receiving the transmission request, scheduling an uplink (UL) grant for the first SIM of the UE.

Example 2 may include the method of example 1, wherein the procedure has an associated time frame in which both the procedure is to be completed and the uplink (UL) grant is to be scheduled for the first SIM of the UE.

Example 3 may include the method of example 1, further comprising refraining from scheduling the UL grant when the associated time frame has expired based on the indication that the UE is an MSIM UE.

Example 4 may include a method for wireless communication by a network, comprising: decoding a capabilities message from a user equipment (UE) indicating the UE is a multi-subscriber identify module (MSIM) UE that includes at least a first SIM and a second SIM; encoding a communication for the first SIM of the UE, the communication configured to cause the UE to perform a radio resource control (RRC) procedure, the RRC procedure having an associated time frame in which to perform the RRC procedure when the procedure is performed by a single-SIM (SSIM) UE; identifying a priority associated with the RRC procedure; and based on the indication that the UE is an MSIM device and the identified priority, generating a time frame in which the RRC procedure is to be completed.

Example 5 may include the method of example 4, wherein identifying the priority comprises identifying that the RRC procedure has a low priority.

Example 6 may include the method of example 5, wherein the RRC procedure does not comprise an initial security activation or an RRC re-establishment.

Example 7 may include the method of example 5, wherein the generated time frame comprises the associated time frame in addition to a pre-defined amount of time associated with any given MSIM UE based on the low priority of the RRC procedure and the indication that the UE is an MSIM UE.

Example 8 may include the method of example 7, further comprising scheduling an uplink (UL) grant for the first SIM upon expiration of the generated time frame.

Example 9 may include the method of example 4, wherein identifying the priority comprises identifying that the RRC procedure has a high priority.

Example 10 may include the method of example 9, wherein the RRC procedure comprises an initial security activation or an RRC re-establishment.

Example 11 may include the method of example 9, wherein the generated time frame comprises the associated time frame in which to perform the RRC procedure when the procedure is performed by an SSIM UE.

Example 12 may include the method of example 9, further comprising scheduling an uplink (UL) grant for the first SIM upon expiration of the generated time frame.

Example 13 may include a method for wireless communication by a network, comprising: decoding a capabilities message from a UE indicating the UE is a multi-subscriber identify module (MSIM) UE that includes at least a first SIM and a second SIM; encoding a communication for the first SIM of the UE, the communication configured to cause the UE to perform a radio resource control (RRC) procedure, the RRC procedure having an associated time frame in which to perform the RRC procedure when the procedure is performed by a single-SIM (SSIM) UE; and based on the indication that the UE is an MSIM device, generating a time frame in which the RRC procedure is to be completed.

Example 14 may include the method of example 13, wherein the generated time frame comprises the associated time frame in addition to an additional percentage of the associated time frame based on the indication that the UE is an MSIM UE having two SIMs.

Example 15 may include the method of example 13, wherein the UE also includes a third SIM.

Example 16 may include the method of example 15, wherein the wherein the generated time frame comprises the associated time frame in addition to an additional percentage of the associated time frame based on the indication that the UE is an MSIM UE having three SIMs, the additional percentage being larger than if the MSIM UE only had two SIMs.

Example 17 may include the method of example 13, wherein decoding the capabilities message further comprises identifying one or more SIM modes supported by the UE and a current active mode associated with the first SIM and the second SIM of the UE.

Example 18 may include the method of example 17, wherein the one or more SIM modes comprise at least one of idle-idle mode, connected-idle mode, and connected-connected mode, and the current active mode comprises at least one of idle-idle mode, connected-idle mode, and connected-connected mode.

Example 19 may include the method of example 18, wherein the generated time frame is also based on a current active mode of the UE.

Example 20 may include the method of example 19, wherein the additional percentage of the generated time frame is larger for connected-connected mode than connected-idle mode and idle-idle mode, and larger for connected-idle mode than idle-idle mode.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, jacket, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described tn or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communication by a network, comprising:
   decoding a capabilities message from a user equipment (UE) indicating the UE is a multi-subscriber identify module (MSIM) UE that includes at least a first SIM and a second SIM;
   encoding a communication for the first SIM of the UE, the communication configured to cause the UE to perform a radio resource control (RRC) procedure;
   decoding a transmission request received from the UE, the transmission request being associated with the RRC procedure, wherein the RRC procedure has an associated time frame in which both the RRC procedure is to be completed and an uplink (UL) grant is to be scheduled for the first SIM of the UE; and
   in response to receiving the transmission request, scheduling the UL grant for the first SIM of the UE.

2. The method of claim 1, further comprising refraining from scheduling the UL grant when the associated time frame has expired based on the indication that the UE is an MSIM UE.

3. A method for wireless communication by a network, comprising:
   decoding a capabilities message from a user equipment (UE) indicating the UE is a multi-subscriber identify module (MSIM) UE that includes at least a first SIM and a second SIM;
   encoding a communication for the first SIM of the UE, the communication configured to cause the UE to perform a radio resource control (RRC) procedure, the RRC procedure having an associated first time frame in which to perform the RRC procedure when the RRC procedure is performed by a single-SIM (SSIM) UE;
   identifying a priority associated with the RRC procedure; and
   based on the indication that the UE is an MSIM device and the identified priority, generating a second time frame in which the RRC procedure is to be completed.

4. The method of claim 3, wherein identifying the priority comprises identifying that the RRC procedure has a low priority.

5. The method of claim 4, wherein the RRC procedure does not comprise an initial security activation or an RRC re-establishment.

6. The method of claim 4, wherein the second time frame comprises the first time frame in addition to a pre-defined amount of time associated with any given MSIM UE based on the low priority of the RRC procedure and the indication that the UE is an MSIM UE.

7. The method of claim 6, further comprising scheduling an uplink (UL) grant for the first SIM upon expiration of the second time frame.

8. The method of claim 3, wherein identifying the priority comprises identifying that the RRC procedure has a high priority.

9. The method of claim 8, wherein the RRC procedure comprises an initial security activation or an RRC re-establishment.

10. The method of claim 8, wherein the second time frame comprises the first time frame in which to perform the RRC procedure when the RRC procedure is performed by an SSIM UE.

11. The method of claim 8, further comprising scheduling an uplink (UL) grant for the first SIM upon expiration of the second time frame.

12. A method for wireless communication by a network, comprising:
   decoding a capabilities message from a UE indicating the UE is a multi-subscriber identify module (MSIM) UE that includes at least a first SIM and a second SIM;
   encoding a communication for the first SIM of the UE, the communication configured to cause the UE to perform a radio resource control (RRC) procedure, the RRC procedure having an associated first time frame in which to perform the RRC procedure when the RRC procedure is performed by a single-SIM (SSIM) UE; and
   based on the indication that the UE is an MSIM device, generating a second time frame in which the RRC procedure is to be completed.

13. The method of claim 12, wherein the second time frame comprises the first time frame in addition to an additional percentage of the first time frame based on the indication that the UE is an MSIM UE having two SIMs.

14. The method of claim 12, wherein the UE also includes a third SIM.

15. The method of claim 14, wherein the wherein the second time frame comprises the first time frame in addition to an additional percentage of the first time frame based on the indication that the UE is an MSIM UE having three SIMs, the additional percentage being larger than if the MSIM UE only had two SIMs.

16. The method of claim 15, wherein decoding the capabilities message further comprises identifying one or more SIM modes supported by the UE and a current active mode associated with the first SIM and the second SIM of the UE.

17. The method of claim 16, wherein the one or more SIM modes comprise at least one of idle-idle mode, connected-idle mode, and connected-connected mode, and the current active mode comprises at least one of idle-idle mode, connected-idle mode, and connected-connected mode.

18. The method of claim 17, wherein the second time frame is also based on the current active mode of the UE.

19. The method of claim 18, wherein the additional percentage of the second time frame is larger for connected-connected mode than connected-idle mode and idle-idle mode, and larger for connected-idle mode than idle-idle mode.

\* \* \* \* \*